United States Patent
Swaine et al.

(10) Patent No.: US 11,379,152 B2
(45) Date of Patent: Jul. 5, 2022

(54) EPOCH-BASED DETERMINATION OF COMPLETION OF BARRIER TERMINATION COMMAND

(71) Applicant: Arm Limited, Cambridge (GB)

(72) Inventors: Andrew Brookfield Swaine, Sheffield (GB); Peter Andrew Riocreux, Cheadle (GB)

(73) Assignee: Arm Limited, Cambridge (GB)

( * ) Notice: Subject to any disclaimer, the term of this patent is extended or adjusted under 35 U.S.C. 154(b) by 3 days.

(21) Appl. No.: 16/898,781

(22) Filed: Jun. 11, 2020

(65) Prior Publication Data

US 2021/0026568 A1 Jan. 28, 2021

(30) Foreign Application Priority Data

Jul. 23, 2019 (GB) ...................................... 1910534

(51) Int. Cl.
*G06F 3/06* (2006.01)
*G06F 12/1009* (2016.01)
*G06F 12/1027* (2016.01)

(52) U.S. Cl.
CPC .......... *G06F 3/0659* (2013.01); *G06F 3/0604* (2013.01); *G06F 3/0673* (2013.01);
(Continued)

(58) Field of Classification Search
CPC ... G06F 12/1009; G06F 12/1036; G06F 9/522
See application file for complete search history.

(56) References Cited

U.S. PATENT DOCUMENTS

2008/0016315 A1* 1/2008 Cohen ................. G06F 12/1036
711/207
2010/0211931 A1 8/2010 Levanoni et al.
(Continued)

FOREIGN PATENT DOCUMENTS

WO 2017/074416 5/2017

OTHER PUBLICATIONS

Search Report and Written Opinion for GB Patent Application No. 1910534.5 dated Feb. 26, 2020, 11 pages.
(Continued)

*Primary Examiner* — Gary W. Cygiel
(74) *Attorney, Agent, or Firm* — Nixon & Vanderhye P.C.

(57) ABSTRACT

An apparatus comprises transaction handling circuitry to issue memory access transactions, each memory access transaction specifying an epoch identifier indicative of a current epoch in which the memory access transaction is issued; transaction tracking circuitry to track, for each of at least two epochs, a number of outstanding memory access transactions issued in that epoch; barrier termination circuitry to signal completion of a barrier termination command when the transaction tracking circuitry indicates that there are no outstanding memory access transactions remaining which were issued in one or more epochs preceding a barrier point; and epoch changing circuitry to change the current epoch to a next epoch, in response to a barrier point signal representing said barrier point. This helps to reduce the circuit area overhead for tracking completion of memory access transactions preceding a barrier point.

18 Claims, 9 Drawing Sheets

(52) U.S. Cl.
CPC ...... *G06F 12/1009* (2013.01); *G06F 12/1027* (2013.01); *G06F 2212/683* (2013.01)

(56) References Cited

U.S. PATENT DOCUMENTS

2014/0006701 A1* 1/2014 Condit ................. G11C 7/1072
   711/105
2018/0307601 A1* 10/2018 Sherlock ............. G06F 12/0804

OTHER PUBLICATIONS

Office Action for GB Application No. 1910534.5 dated Mar. 8, 2022, 3 pages.

* cited by examiner

EPOCH-BASED DETERMINATION OF COMPLETION OF BARRIER TERMINATION COMMAND

This application claims priority to GB 1910534.5 filed Jul. 23, 2019, the entire contents of which are hereby incorporated by reference.

BACKGROUND

Technical Field

The present technique relates to the field of data processing.

Technical Background

A data processing system may issue memory access transactions to be serviced by a memory system. A barrier termination command may be defined which, when executed, requests that the system signals completion of the barrier termination command when it has been determined that any memory access transactions which were issued before a certain barrier point have completed. Such barriers can be useful to constrain out of order execution of operations, or for handling situations where an update to certain control information is made and it is desired to enforce that subsequently performed operations observe the updated control information. There can be a significant circuit overhead in tracking whether the memory access transactions preceding the barrier point have completed.

SUMMARY

At least some examples provide an apparatus comprising: transaction handling circuitry to issue memory access transactions, each memory access transaction specifying an epoch identifier indicative of a current epoch in which the memory access transaction is issued; transaction tracking circuitry to track, for each of at least two epochs, a number of outstanding memory access transactions issued in that epoch; barrier termination circuitry to signal completion of a barrier termination command when the transaction tracking circuitry indicates that there are no outstanding memory access transactions remaining which were issued in one or more epochs preceding a barrier point; and epoch changing circuitry to change the current epoch to a next epoch, in response to a barrier point signal representing said barrier point.

At least some examples provide an apparatus comprising: means for issuing memory access transactions, each memory access transaction specifying an epoch identifier indicative of a current epoch in which the memory access transaction is issued; means for tracking, for each of at least two epochs, a number of outstanding memory access transactions issued in that epoch; means for signalling completion of a barrier termination command when the means for tracking indicates that there are no outstanding memory access transactions remaining which were issued in one or more epochs preceding a barrier point; and means for changing the current epoch to a next epoch, in response to a barrier point signal representing said barrier point.

At least some examples provide a method comprising: issuing memory access transactions, each memory access transaction specifying an epoch identifier indicative of a current epoch in which the memory access transaction is issued; tracking, for each of at least two epochs, a number of outstanding memory access transactions issued in that epoch; changing the current epoch to a next epoch, in response to a barrier point signal representing a barrier point; and signalling completion of a barrier termination command when the tracking indicates that there are no outstanding memory access transactions remaining which were issued in one or more epochs preceding the barrier point.

Further aspects, features and advantages of the present technique will be apparent from the following description of examples, which is to be read in conjunction with the accompanying drawings.

DESCRIPTION OF EXAMPLES

Figure 1:
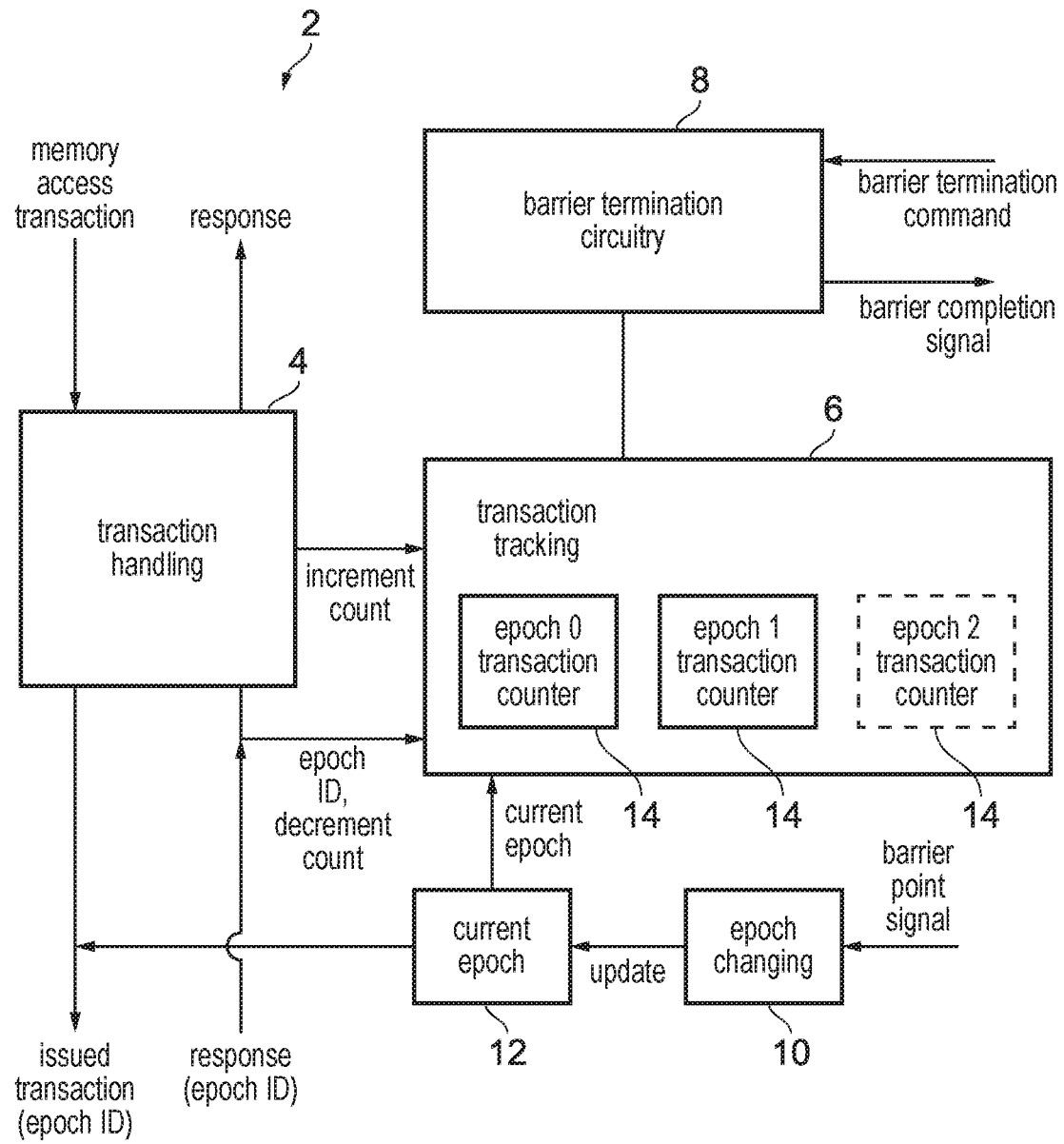
FIG. 1 schematically illustrates an example of an apparatus supporting epoch-based tracking of memory access transactions and barrier termination command completion.

A data processing system may support a barrier termination command which requests that the system signals completion of the command when it has been determined that memory access transactions preceding a certain barrier point have completed. However, there can be a challenge in meeting the competing demands for high system performance and efficiency of circuit area and power consumed by the apparatus.

One approach can be that when the barrier termination command is received, the system can simply stop issuing memory access transactions and wait for all prior transactions to complete before signalling completion of the barrier termination command and then resuming issuing memory access transactions. While this technique is simple to implement in terms of circuit area and power budget, it has a very high performance impact because all memory access transactions are blocked from being issued in the period between receipt of a barrier termination command and its completion.

An alternative technique would be to maintain a full tracking structure which tracks identifiers of every issued transaction, and when a corresponding response is received to a given transaction the transaction is marked as complete. When a barrier termination command is received, all yet to be completed (outstanding) memory access transactions may be marked as 'subject to checking', and once it is detected that there are no longer any outstanding transactions marked as 'subject to checking' then the completion of the barrier termination command could be signalled. This approach gives much better performance, but requires significantly more circuit area for the transaction tracker. In practice, this approach does not scale well with increasing numbers of outstanding transactions, because in addition to the storage circuitry required for each entry of the transaction tracker, it would also be necessary to provide comparison logic for comparing transaction identifiers of each transaction response against every entry of the transaction tracker, to detect when a given transaction is complete. This approach limits the scalability of the transaction tracker, and so limits the maximum number of outstanding transactions that can be supported.

To address these considerations, the inventors proposed a different approach. Transaction handling circuitry issues memory access transactions which specify an epoch identifier which indicates a current epoch in which the memory access transaction is issued. Transaction tracking circuitry may track, for each of at least two epochs, a number of outstanding memory access transactions issued in that epoch. Barrier termination circuitry may signal completion of a barrier termination command when the transaction tracking circuitry indicates that there are no outstanding memory access transactions remaining which were issued in one or more epochs preceding a barrier point. Epoch changing circuitry may change the current epoch to a next epoch in response to a barrier point signal representing the barrier point.

This approach provides a better balance between performance and circuit area overhead. By providing the functionality to separate the memory access transactions into epochs, changing the epoch allocated to transactions in response to a barrier point signal representing the barrier point, and using transaction tracking circuitry to track the number of outstanding memory access transactions issued in a particular epoch, this means that it is possible to detect when a barrier termination command can be signalled as completed without needing to halt the issuing of memory access transactions, but with transaction tracking circuitry having a lower circuit area cost than if individual transactions are tracked based on their transaction identifier.

Each epoch is a certain time period within which memory access transactions are issued. It will be appreciated that the duration of a particular epoch need not be fixed and in practice the duration of one epoch may vary compared to the next epoch, depending on the relative timing of receiving the barrier point signal.

In some implementations the barrier point signal may comprise the barrier termination command itself. In this case, the same command triggers both the changing of the current epoch to the next epoch, and causes the barrier termination circuitry to start tracking whether it can signal completion of the barrier termination command. In the case when the barrier point signal comprises the barrier termination command itself, the relevant epoch to be checked by the barrier termination circuitry may be the epoch which was the current epoch at the time of receiving the barrier termination command (prior to the current epoch being changed to the next epoch in response to the barrier termination command). Hence, with this example, when the barrier termination command is received, the barrier termination circuitry waits for the transaction tracking circuitry to indicate that there are no outstanding memory access transactions remaining which were issued in the current epoch (the epoch which was current at the time of receiving the barrier termination command), before signalling completion of the barrier termination command. In addition, the current epoch is changed to the next epoch in response to the barrier termination command so that any memory access transactions issued after receipt of the barrier termination command would specify the next epoch.

In other implementations, the barrier point signal may comprise a barrier point identifying signal different to the barrier termination command. With this approach, a separate command may be defined which enables the barrier point to be defined at a point of time different to the timing of receipt of the barrier termination command. This could be useful in some scenarios as it may allow the barrier point to be identified more precisely, which may mean that the completion of the barrier termination command does not need to be delayed while waiting for completion of any memory access transactions issued between receipt of the barrier point identifying signal and receipt of the barrier termination command. This can be good for performance in some cases, because this may allow the completion of the barrier termination command to be signalled sooner, enabling subsequent operations which must wait for completion of the barrier termination command to be started earlier. In the case where the barrier point signal is a separate barrier point identifying signal from the barrier termination command, the one or more epochs which are checked by the barrier termination circuitry may be those epochs which are older than the epoch which is the current epoch at the time of receiving the barrier termination command. With this approach, it can be useful for the transaction tracking circuitry to support tracking of epochs for at least three or more different epochs, as it may be possible that multiple barrier point identifying signals could be received in succession before a barrier termination command is received, and so being able to support a larger number of epochs can enable more precise pinpointing of the most recent barrier point before a given barrier termination command was received, which can enable a faster response to the barrier termination command than if the epochs could not be defined as precisely.

The technique discussed above can be used for handling any type of barrier termination, where it needs to be checked whether memory access transactions preceding a barrier point have completed, before completion of the barrier termination command can be signalled. However, for some types of barrier termination command, it may be that for other reasons it is needed to provide a full transaction tracker anyway to individually check transaction responses against transaction identifiers of individual transactions in the transaction tracker, and if such a full transaction tracking structure is already provided then it may be more efficient for those types of barriers to be handled using the alternative technique discussed above where the full transaction tracker compares transaction identifiers, so that it is not needed to use the epoch-based approach discussed above.

However, the epoch-based approach can be particularly useful for handling a particular form of barrier termination command which is an invalidation synchronisation command used following invalidation of page table information from a translation lookaside buffer. A translation lookaside buffer is a cache of page table information from page tables in the memory system, which provides address translation data for controlling memory address translation and/or memory permission data for specifying whether memory access transactions are allowed to particular regions of the address space. Hence, the transaction handling circuitry may initiate a lookup in the translation lookaside buffer (TLB), to check the page table information corresponding to an address specified by a memory access transaction to be issued. An invalidation command may be provided, in response to which the TLB invalidates page table information satisfying a certain invalidation condition. Often, TLBs may be required to invalidate page table information when the underlying page table structure in the memory system has been updated by software, to ensure that subsequently issued memory access transactions cannot lookup out of date page table information. Hence, an invalidation synchronisation command may be defined which requests that the barrier termination circuitry signals completion when the invalidation of the TLB has completed and also at least any memory access transactions for which the lookup in the TLB was performed prior to receipt of the invalidation command have completed. Some TLBs may be located in a component which does not have a full transaction tracker supporting comparison of individual transaction identifiers against each entry of the tracker, as the full transaction tracker may not be needed for other purposes. For such TLBs, introducing the full transaction tracker solely for the purpose of tracking completion of invalidation synchronisation commands would introduce a significant amount of additional circuit area cost. Hence, for dealing with this type of barrier termination, the epoch-based approach discussed above can be particularly useful because it enables the need for a full transaction tracker to be avoided, reducing circuit area, without incurring the performance cost of freezing issuing of transactions upon receipt of the invalidation synchronisation command. Hence, it can be useful if the barrier termination command discussed above is the invalidation synchronisation command for synchronising operations following a TLB invalidation.

In some implementations, the invalidation command and the invalidation synchronisation command may actually be the same command. That is, the processor architecture may define a single command which functions both as the invalidation command requesting that invalidation of page table information is performed, and as the invalidation synchronisation command requesting a confirmation that memory access transactions preceding the invalidation have completed. Hence, in this case, the single command acting as invalidation command and invalidation synchronisation command also functions as both the barrier point signal and the barrier termination command mentioned above.

On the other hand, in other architectures, the invalidation command may be a different command to the invalidation synchronisation command. In this case, while the invalidation synchronisation command functions as the barrier termination command described above, the barrier point signal described above could be either the invalidation command or the invalidation synchronisation command. Defining the invalidation synchronisation command as the barrier point signal may have the advantage that this may require fewer epochs to be supported, while defining the invalidation command as the barrier point signal may have an advantage that this can enable faster response to synchronisation operations because the barrier point is at an earlier point of execution than the invalidation synchronisation command, enabling operations which must wait for completion of the barrier termination command to start sooner.

In the case where the barrier point signal is the invalidation command, note that while in general the epoch may be changed in response to the invalidation command, there may be some flexibility to vary the exact timing at which the epoch is actually changed relative to receipt of the invalidation command, as long as the receipt of the invalidation command does eventually cause the epoch to be changed. If lookups to the TLB are allowed to proceed while an invalidation operation is in progress, the trigger for the current epoch to be updated to the next epoch could be the completion of the invalidation operation performed for a given invalidation command (rather than the mere receipt of the invalidation command)—this may ensure that any transactions which accessed the TLB at a time when the TLB may only be partially invalidated are given the current epoch identifier rather than the next epoch identifier, to ensure they would need to be completed before a barrier termination based on the current epoch can be signalled as complete, as there is a risk they could have hit against the old translation data.

In other implementations, the TLB may be arranged to prevent further requests looking up the TLB during a period when the entries of the TLB are being walked for a TLB invalidation operation. Hence, in this case, the exact timing of updating the current epoch identifier relative to the start and end of the TLB invalidation operation may not matter, as long as transactions looked up in the TLB prior to the start of the TLB invalidation operation are allocated the current epoch identifier and transactions looked up after the end of the TLB invalidation operation are allocated the next epoch identifier.

Alternatively, another design when walking through each TLB entry in turn to check for whether it matches invalidation conditions could record a progress identifier of the latest TLB entry which has been reached in the invalidation walk, and during the invalidation walk lookups to the TLB may still proceed. In this case, transactions that hit against entries which are earlier in the walk sequence than the entry indicated by the progress identifier could be allocated the next epoch identifier (as they would have hit against entries which were not invalidated and so are still correct), and the transactions that hit against entries which are later in the walk sequence than the entry indicated by the progress identifier being allocated the current epoch identifier (as there is a risk they could still contain out of date translation data and so the issued transactions should be tracked as preceding the barrier point), until the invalidation sequence is complete and then the current epoch is fully updated to the next epoch identifier to be used for subsequent transactions.

Another implementation options could be that, as it may be common for several invalidation commands are received in short succession (e.g. specifying different addresses subject to invalidation), some TLB implementations could choose to perform TLB invalidations lazily, storing tracking information which gathers up information on a series of received TLB invalidation commands, to allow a single walk through the entries of the TLB to implement multiple different sets of invalidation criteria, with each entry being checked against the invalidation criteria of all the received TLB invalidation commands that were tracked in the tracking information. Therefore, for such an implementation, it may be preferred that the actual changing of the current epoch is deferred relative to receipt of the invalidation command, until the point when the requested invalidation of TLB entries is actually performed.

Hence, it will be appreciated that a number of options are available for implementing TLB invalidations, so while in general the epoch may be changed in response to receipt of an invalidation command, there is some flexibility for how this is implemented.

The transaction tracking circuitry may comprise two or more transaction counters, each arranged to count the number of outstanding memory access transactions issued in a corresponding epoch. In response to a memory access transaction to be issued by the transaction handling circuitry, the transaction tracking circuitry may increment a transaction counter corresponding to the current epoch. Transaction responses received by the transaction handling circuitry may specify the same epoch identifier that was specified by the corresponding memory access transaction to which that transaction response is responding. Hence when a transaction response is received, the transaction tracking circuitry may decrement a transaction counter which corresponds to the epoch indicated by the epoch identifier specified by the transaction response. In this way, the number of outstanding transactions can be tracked and when the counter reaches zero then it can be determined that there are no remaining memory access transactions issued in a particular epoch.

In general, when a given transaction counter is reset, it may be reset to a particular reset value. When the counter has the reset value, this indicates there are no outstanding transactions of the type counted by the counter which were issued in the epoch corresponding to that counter. Although it may be most common for the reset value to be zero, this is not essential and other reset values could also be used. The terms "increment" and "decrement" refer to adjustments to the counter by a given step size, with the increment being an adjustment in the opposite direction to the decrement. Although most commonly, the increment may comprise adding 1 to the counter value and the decrement may comprise subtracting 1 from the counter, other implementations could act in the opposite direction where the increment is a subtraction and the decrement is an addition. Also step sizes other than 1 could be used.

In some implementations the transaction counters for counting outstanding transactions may be divided into separate counters for particular classes of memory access transactions. For example, it may be useful to provide separate counters for read and write transactions respectively. In this case, the read transactions issued in a particular epoch would be tracked by one transaction counter and the write transactions issued in the same epoch may be tracked by a separate transaction counter from the read transactions. This can be useful because in some memory systems read and write channels may be managed separately with little crossover between the circuitry for handling the read transactions and the circuitry for handling the write transactions, and so to reduce the amount of cross-wiring to a shared counter which tracks both reads and writes, it can be simpler to provide separate counters in the read and write channel circuitry respectively. In this case, then the transaction tracking circuitry will not indicate that all outstanding memory access transactions have completed for a given epoch until both the read and write transaction counters for that epoch have reached their reset value.

Alternatively, both reads and writes could be tracked with the same counter, in some example implementations.

Also, it is not essential for the transaction tracking circuitry to track every issued memory access transaction using its transaction counters. For some types of barrier termination command, it may only be necessary to ensure that there are no outstanding memory access transactions of a particular type remaining which were issued preceding the barrier point. In this case the transaction tracking circuitry may not need to track any memory access transactions other than a certain type or set of types. Hence, when the transaction tracking circuitry indicates that there are no outstanding memory access transactions remaining issued in a particular epoch, this does not necessarily mean that all transactions issued in that epoch have definitely completed, but may merely mean that, of the outstanding memory access transactions of the type(s) to be tracked by the transaction tracking circuitry, there are no outstanding memory access transactions remaining for that epoch.

For other types of barrier, the barrier may be a general barrier which is applied to all types of outstanding memory access transactions, and for such barriers the transaction tracking circuitry may track the number of outstanding memory access transactions regardless of their type (although reads and writes could still be tracked separately as discussed above, but without further limiting tracking of reads or writes to particular types of read/write).

In some examples the maximum number of epochs supported by the transaction tracking circuitry may be two. Hence the transaction tracking circuitry may track the number of outstanding memory access transactions for only two epochs. Two epochs can be enough to deal with a single barrier termination command at a time. In this case if a subsequent barrier termination command is received before completion of an earlier barrier termination command, then that subsequent barrier termination command may have to wait.

Alternatively, the transaction tracking circuitry may support more than two epochs. This can be useful for handling the implementations where the epoch is changed in response to a barrier point identifying signal different to the barrier termination command as discussed above, but could also be provided in the case where the barrier point signal comprises the barrier termination command itself, to enable handling of more barriers at a time. In practice the performance increment provided by supporting multiple parallel synchronisation or barrier termination operations may not justify the added overhead of supporting more than two epochs, but nevertheless it is an option for implementations where performance is particularly critical and circuit area budget is less constrained.

Regardless of the number of epochs supported, if all of the epochs have already been allocated and still have some outstanding memory access transactions remaining, and a further barrier point signal is received, then the epoch changing circuitry may prevent the current epoch being changed to the next epoch. Similarly, the epoch changing circuitry may prevent the current epoch being changed to the next epoch if there is still an earlier barrier termination command which requires checking of completion of memory access transactions for one or more epochs including the next epoch, and the earlier barrier termination command has not yet been signalled as completed. In these scenarios then the epoch may not be changed to the next epoch in response to the barrier point signal. This may not affect architectural correctness of the processing, but may simply delay completion of a subsequent barrier termination command on some occasions. Nevertheless, this scenario may be relatively rare in most expected scenarios, as barrier termination commands may be relatively rare.

FIG. 1 schematically illustrates a portion of a data processing system 2. FIG. 1 shows a number of components of the system 2 involved in detection of completion of barrier termination commands. It will be appreciated that the system 2 may include many other components which may not be directly involved in the barrier termination decision. The system 2 includes transaction handling circuitry 4, transaction tracking circuitry 6, barrier termination circuitry 8 and epoch changing circuitry 10. The system also includes a current epoch storage element 12 (such as a register) which stores an identifier identifying which epoch is the current epoch.

The transaction handling circuitry 4 is responsible for receiving memory access transactions from an upstream transaction source, issuing the transactions to a downstream memory system component, receiving responses to the issued transactions from the downstream memory system component and passing the responses back to the upstream transaction source. The transaction handling circuitry 4 could be located within a number of points of a memory system, for example within an interconnect, memory controller, or memory management unit for example.

The transaction tracking circuitry 6 includes a number of transaction counters 14 which each track the number of outstanding memory access transactions which were issued in a particular period of time called an epoch. When the transaction handling circuitry 4 receives a memory access transaction to be issued, it may issue the transaction downstream, appended with an identifier of the current epoch, as derived from the current epoch register 12. Also, the transaction handling circuitry 4 may control the transaction tracking circuitry 6 to increment the transaction counter 14 which corresponds to the current epoch.

When a barrier point signal is received, the epoch changing circuitry 10 may control updating of the current epoch to a next epoch. For example the current epoch may be cycled through the supported epochs in a certain sequence (e.g. 0, 1, 0, 1 . . . in a system supporting 2 epochs, or 0, 1, 2, 3, 0, 1, 2, 3, . . . in a system supporting 4 epochs) and the update may simply switch the current epoch to the next epoch in the cycle. The barrier point signal may be any signal which marks a barrier point of execution at which it is useful to divide memory access transactions into a set of transactions which were issued before the barrier point and a set of transactions issued after the barrier point. Hence, by appending the epoch identifier to each issued transaction to indicate the current epoch at the time the transaction was issued, this means that the completion of transactions associated with each epoch can be tracked by monitoring the epoch identifiers specified by the corresponding transaction responses. When a transaction response is received specifying a given epoch identifier, the transaction tracking circuitry 6 decrements the transaction counter 14 for the epoch identified by the epoch identifier specified by the transaction response that was received. A downstream memory component may append an epoch identifier to a transaction response which matches the epoch identifier specified in the issued memory access transaction to which that response is generated.

The barrier termination circuitry 8 may use the tracking provided by the transaction tracking circuitry 6 to determine when a barrier termination command can be marked as completed. When the barrier termination command is received, the barrier termination circuitry 8 checks the current epoch register 12 to determine which previous epochs need to have all their memory access transaction completed before the barrier termination command can be signalled as complete. Which epochs are the relevant epochs to check may depend on the way the barrier point signal is defined relative to the barrier termination command. For implementations where the barrier point signal is the barrier termination command itself, the relevant epoch to check is simply the current epoch at the time of receiving the barrier termination command. Hence in this case, the barrier termination circuitry may check the transaction counter 14 corresponding to the current epoch 12 at the time of receiving the barrier termination command, and when that transaction counter returns to its reset value (the value which the counter would hold when there are no outstanding transactions issued in that epoch, e.g. the reset value could be zero) then the barrier termination circuitry 8 can issue the barrier completion signal to indicate that it is now safe to proceed with any operations which have to wait for completion of memory accesses preceding the barrier point.

On the other hand, other implementations may define a separate barrier point signal from the barrier termination command, so that it is possible for the barrier point signal to mark an earlier point of processing compared to the point at which the barrier termination command is received. In this case the relevant epochs to check using the barrier termination circuitry 8 may be one or more epochs which are older than the current epoch indicated by the current epoch register 12 at the time of receiving the barrier termination command. In a system supporting 2 epochs then if the current epoch is epoch 0 then the older epoch would be epoch 1 and if the current epoch is epoch 1 then the older epoch would be epoch 0. Some systems may support more than 2 epochs and in this case multiple older epochs may need to be checked. In some cases the checking of older epochs could simply be implemented as a check of whether the transaction counters 14 for any epoch other than the current epoch 12 at the time of receiving the barrier termination command indicates that there are no outstanding transactions remaining for those epochs.

Hence, regardless of the way in which the barrier point signal is defined, the barrier termination circuitry issued the barrier completion signal when the transaction counter or counters for one or more particular epochs indicate that there are no transactions remaining. This approach allows the barrier completion to be determined without needing a complex transaction tracker which tracks the identifiers of individual memory access transactions and compares transaction identifiers of each response against each entry of the transaction tracker, which greatly saves circuit area in eliminating not only the storage overhead of the transaction tracking entries themselves but also the related comparison logic. Also, this approach means it is not necessary to halt issuing memory access transactions when a barrier termination command is received, as it is possible to continue issuing the memory access transactions with a changed epoch while still being able to identify the set of earlier transactions which need to be completed before the barrier termination command can be considered complete.

FIGS. 2-5 show flow diagrams illustrating actions taken in response to various events.

Figure 2:
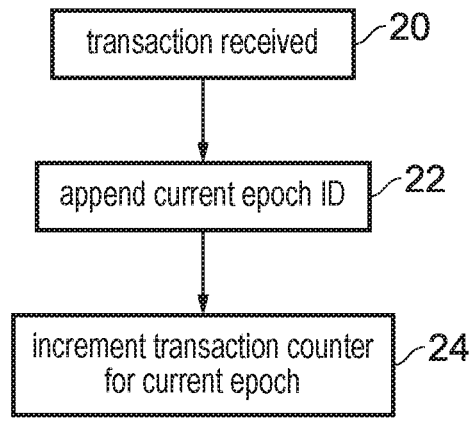
FIGS. 2 to 5 are flow diagrams illustrating methods of responding to a memory access transaction, a transaction response, a barrier point signal and a barrier termination command respectively.

FIG. 2 shows actions taken in response to receipt of a memory access transaction by the transaction handling circuitry 4. At step 20, the transaction is received. In response, at step 22 the transaction handling circuitry 4 obtains an identifier of the current epoch from the current epoch register 12 and issues the memory access transaction to a downstream memory system component, with the issued transaction specifying the current epoch identifier. At step 24 the transaction handling circuitry 4 controls the transaction tracking circuitry 6 to increment a transaction counter associated with the current epoch. It will be appreciated that steps 22 and 24 could be performed in the opposite order to that shown in FIG. 2, or could be performed in parallel.

Figure 3:
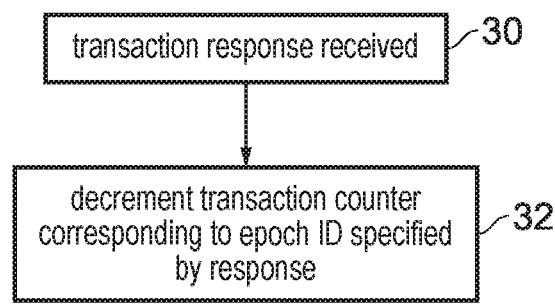

FIG. 3 shows actions performed in response to receipt of a transaction response from the downstream memory component. At step 30 the transaction handling circuitry 4 receives the transaction response, which specifies a given epoch identifier. The given epoch identifier identifies the epoch associated with the corresponding memory access transaction which caused the downstream component to generate that transaction response. At step 32 the transaction handling circuitry controls the transaction tracking circuitry 6 to decrement a transaction counter 14 which corresponds to the epoch identifier specified by the transaction response.

Figure 4:
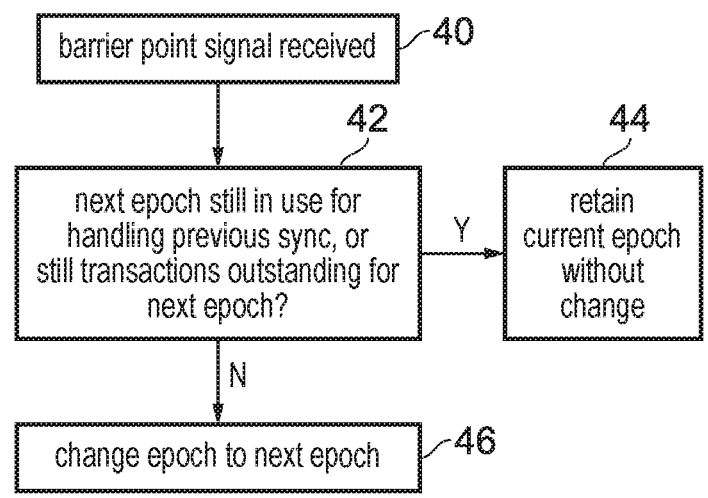

FIG. 4 shows actions performed in response to the barrier point signal, which may be generated in response to an instruction executed by a CPU or other processing element not shown in FIG. 1. As discussed above, this could be the barrier termination command itself or could be a separately defined barrier point signal. At step 40 the barrier point signal is received by the epoch changing circuitry 10. At step 42, in response to receipt of the barrier point signal, the epoch changing circuitry 10 detects whether the epoch which would be the next epoch after the current epoch is still in use for handling a previous synchronisation (barrier termination command) or whether there are still any transactions outstanding associated with the next epoch. If either of these conditions is the case, then at step 44 the epoch changing circuitry 10 does not update the current epoch and so the current epoch is retained without change. This is because all of the available epochs would already be in use for handling previous barrier termination commands and so changing the epoch at this stage would result in incorrect results as it may result in transactions issued earlier than the barrier point and transactions issued after the barrier point being considered to be in the same epoch which may be undesirable. On the other hand, if the next epoch is not in use for handling any previous synchronisation and there are no transaction outstanding for the next epoch then at step 46 the epoch is changed to the next epoch, so that transactions before and after the barrier point can be distinguished by the transaction tracking circuitry 6.

Figure 5:
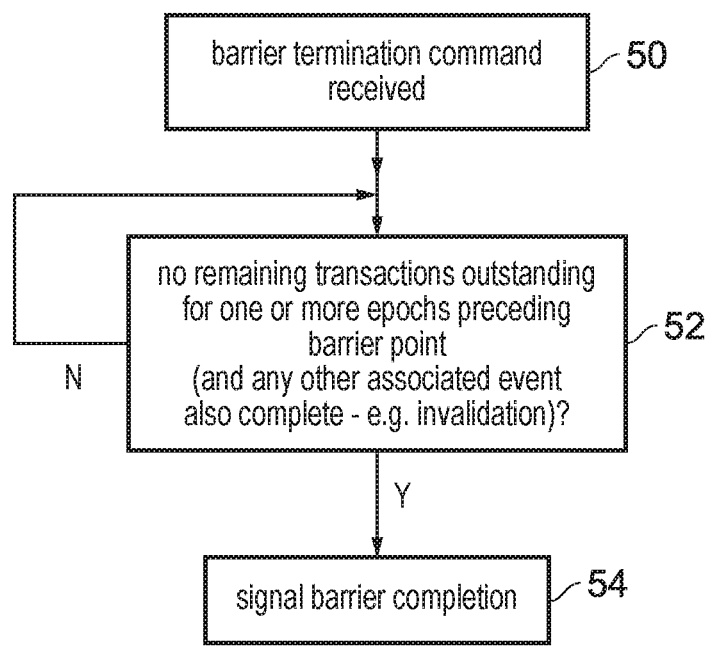

FIG. 5 shows actions taken in response to receipt of the barrier termination command, which may again be generated in response to an instruction executed by the CPU or other processing element. At step 50 the barrier termination circuitry 8 receives the barrier termination command. In response, the barrier termination circuitry 8 checks the transaction counters 14 maintained by the transaction tracking circuitry 6. At step 52 the barrier termination circuitry determines, based on the transaction counters 14 for one or more particular epochs preceding an associated barrier point, whether there are no remaining transactions outstanding for any of those one or more epochs. These one or more epochs could be the current epoch, or could be epochs older than the current epoch, depending on whether the barrier point signal is the same as the barrier termination command or a different signal as discussed above. In some cases, completion of the barrier termination command may also depend on whether another associated event is also complete, such as invalidation of control data in a cache such as a TLB as discussed further below. Hence, if it is determined that there is at least one remaining transaction from the one or more epochs outstanding, or if any other associated event required for completion the barrier termination has not yet completed, then the barrier termination circuitry 8 waits and continues checking whether the condition in step 52 is satisfied. Eventually once there are no remaining transactions outstanding for the one or more epochs preceding the barrier point and, if required, any other associated event is also complete, then at step 54 the barrier termination circuitry 8 generates the barrier completion signal to signal that the barrier termination command is complete. This barrier completion signal may be a trigger for other events in the data processing system 2 to proceed. For example, there may be some instructions which are made dependent on the barrier termination command so that they cannot proceed until the barrier termination command has completed.

The epoch identifier appended to the memory access transactions and the corresponding transaction responses can be signalled in different ways within a memory transaction protocol. Some existing architectures for defining the format of memory access transactions may already specify certain user-controlled fields which do not have a compulsory function specified in the architecture, but are free for particular micro-architectural implementations of processors supporting the architecture to use as is considered appropriate. Hence, some micro-architectural implementations of the memory system could use those user-controlled bits to encode the epoch identifier and then the circuitry 4,6,8,10,12 shown in FIG. 1 could exploit those user-controlled bits to track transactions allocated to particular epochs in the way discussed above.

Alternatively, in other cases the epoch identifier may be defined at an architectural level so that all implementations of systems supporting a particular memory protocol architecture may be required to identify the epoch identifier in the memory transaction format, and in this case the epoch identifier may be a new field added to the architectural definition of the format in which memory access transactions should be encoded.

Another approach could be that each transaction has a transaction identifier, and transactions associated with one epoch may use a transaction identifier from a different set of one or more transaction identifiers to the set of one or more transaction identifiers allocated for use in a different epoch. Hence, in some cases the epoch identifier may be the transaction identifier itself. This approach can be used for protocols where allocating different transactions identifiers for the purpose of epoch tracking, to transactions which otherwise would have shared the same transaction identifier, does not cause any other side-effects.

However, for other protocols, the transaction identifier may provide ordering information (e.g. transactions with the same transaction identifier may be required to be handled in the same order as which the transactions were received), and in this case it may not be appropriate to use the transaction identifiers to distinguish transactions in different epochs (e.g. as transactions which should be handled in order might accidentally be handled out of order if they were given transaction identifiers associated with different epochs). For protocols which use the transaction identifier for other purposes, it may be preferred to use the user-controlled field or a dedicated epoch identifier as discussed above.

Figure 6:
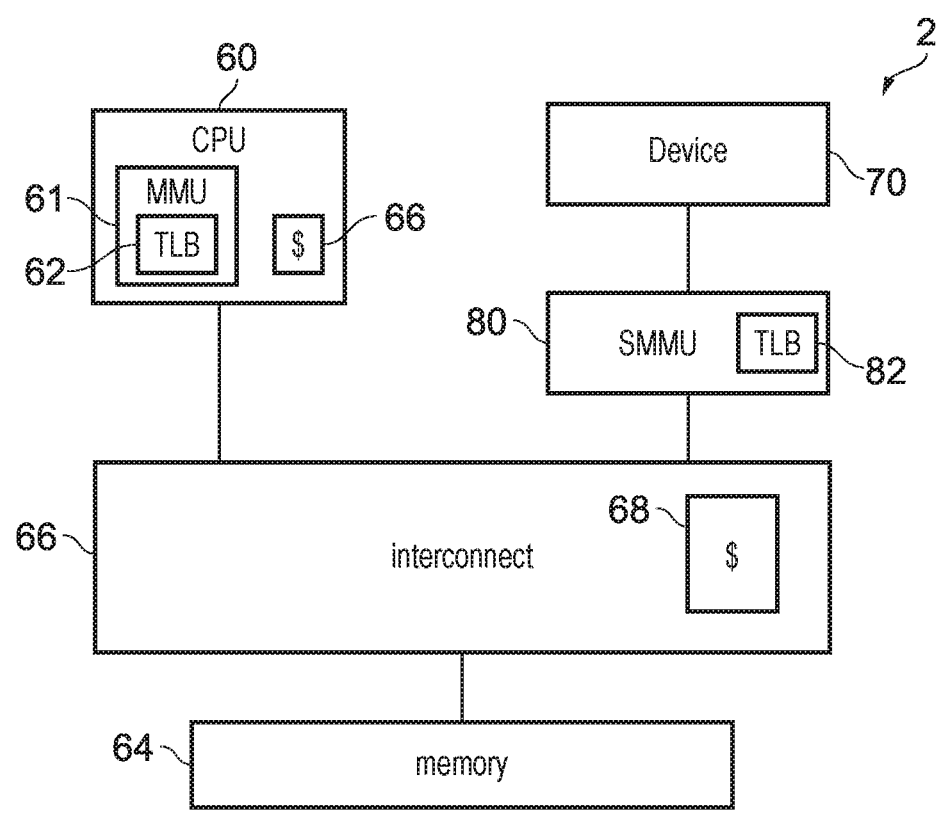
FIGS. 6 and 7 show in more detail a specific implementation where the barrier termination command is an invalidation synchronisation command for detecting completion of transactions issued before an invalidation of translation data in a translation lookaside buffer.
Figure 7:
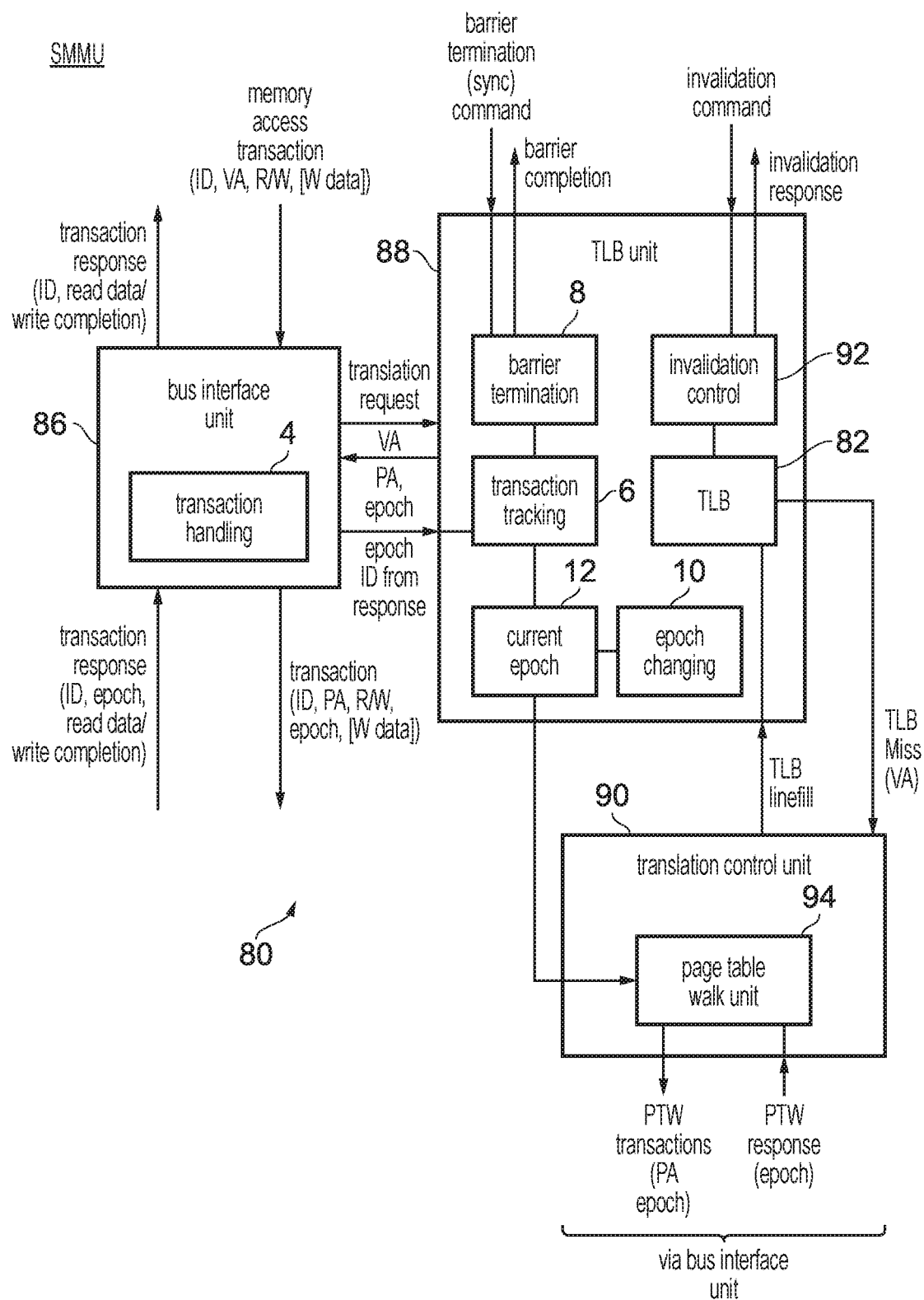

The techniques shown in a general sense in FIG. 1-5 can be useful for tracking completion of any type of barrier termination command, which causes the processing system to signal when that memory transactions issued prior to a certain barrier point have completed. However they can be particularly useful for a particular type of barrier termination command, used to check that transactions, which may have used translation data from a TLB prior to an invalidation point at which translation data is invalidated from the TLB, have completed before subsequent operations proceed. This can be useful especially when page table structures in memory are updated and the TLB is flushed of out of date translation entries. FIGS. 6 and 7 show a more specific hardware example which uses the epoch based tracking scheme to handle such synchronisation following TLB invalidation. FIG. 6 shows a broader view of the data processing system 2 while FIG. 7 shows specific components of a system memory management unit (SMMU).

As shown in FIG. 6, the data processing system 2 may include one or more central processing units (CPUs) 60 which include a memory management unit (MMU) 61 which may have at least one translation lookaside buffer (TLB) 62 for caching page table information from a page table structure stored in memory 64. The CPU may have at least one cache 66 for caching data from memory. The MMU 61 may be responsible for controlling address translation between virtual addresses specified by instructions executed by the CPU 60 and physical addresses used by the memory system, and may also check whether memory accesses triggered by the CPU 60 satisfy access permissions defined in the page table structure. The TLB 62 is used to cache a certain subset of recently used page table entries for faster access by the CPU than if the structures and memory had to be checked every time a memory access is initiated.

Access to memory from the CPU is controlled via an interconnect 66, which may route transactions from multiple master devices into the memory and may also maintain coherency between caches in different master devices. The interconnect 66 may also comprise a system cache 68 for caching data shared by different master devices and for providing faster access to some data than if the memory 64 had to be accessed.

In addition to one or more masters such as the CPU 60 which have their own internal MMU 61, the system 2 may also include at least one device 70 which may not have an internal MMU but nevertheless requires access to the memory 64 and may need some address translation functionality and/or checking of access permissions to be performed to check whether device 70 is allowed to access certain addresses in memory. Therefore, a system memory management unit (SMMU) 80 is provided to provide functions on behalf of the device 70 which are equivalent to that of the MMU 61 within the CPU 60. While FIG. 6 only shows one device 70, the same SMMU 80 may be shared between two or more different devices 70. As in the MMU 61, the SMMU 80 may have its own internal TLB 82 which caches information derived from page table entries from the memory system.

Hence, when software executing on the CPU 60 updates the page table structures in the memory system, this may require some of the translation entries within the TLBs 62,82 to be invalidated, to make sure that memory access transactions initiated after the update of the page table data cannot lookup out of date information in the TLB 62,82. Such updates of page table structures may typically be performed by a supervisory software process executing on the CPU 60 which is more privileged than the process whose memory accesses may be controlled by that page table structure. It may be possible to do TLB invalidations in a more fine grained manner than simply invalidating the entire TLB, for example limiting the entries to the invalidated based on a context identifier which identifies a certain translation context associated with particular entries of the TLB, which could be based on a current operating state of the CPU 60 at the time the TLB invalidation is requested or on an operand specified by a TLB invalidation instruction. Hence, it is less likely that the TLB invalidation triggered by the CPU 60 will have a significant impact on performance at the CPU 60 itself, since often at the time when the TLB invalidation is requested the CPU may not be running instructions from the software process which would be governed by the set of translation entries to be invalidated.

However, for the device 70, the TLB invalidation may have a much greater overhead in terms of performance. Typically, when TLB information needs to be invalidated because of a change to the page table structure then it may be necessary to ensure that it is known when any outstanding transactions issued before the TLB invalidation have been completed so that it can be known when to resume processing of subsequent operations which need to be guaranteed to rely on the new page table data. As the device issues memory access transactions unaware of what is happening at CPU 60 and there is no guarantee that the device will be handling transactions from a different translation context to the one subject to invalidation, then it is more likely that handling of synchronisations following a TLB invalidation will impact on the performance of the device 70. Therefore it can be useful to provide within the SMMU 80 functionality for reducing the performance impact following invalidations. This means that it can be strongly desirable not to use a technique for handling synchronisations or barrier terminations which requires the SMMU 80 to stop issuing device memory access transaction to the interconnect 66. Nevertheless, it is also desirable that the SMMU 80 has a relatively manageable circuit area overhead and that the SMMU design is scalable to a relatively large number of outstanding transactions at a time to avoid impacting on performance. This is a particular problem if the SMMU supports handling of transactions from multiple devices and a number of devices with which the SMMU is to communicate is to be scalable across different system designs having different numbers of devices 70. The epoch based scheme discussed above is therefore particularly useful for the SMMU 80.

FIG. 7 shows in more detail components of the SMMU 80. The SMMU 80 includes a bus interface unit 86, a TLB unit 88 and a translation control unit 90. The bus interface unit 86 includes the transaction handling circuitry 4 described above and is responsible for receiving memory access transactions from the device 70, forwarding them to the interconnect 66 and passing the corresponding transaction responses received from the interconnect 66 back to the device 70. The TLB unit 88 handles looking up the TLB 82 based on a target address specified by a received memory access transaction, as well as invalidations of translation data from the TLB and handling of barrier termination commands. Hence the TLB unit 88 includes the transaction tracking circuitry 6, barrier termination circuitry 8, epoch changing circuitry 10 and current epoch register 12 shown above as well as invalidation control circuitry 92 for handling the TLB invalidation. The translation control unit 90 is provided for handling generation of page table walk memory access transactions to request fetching of page table data from page table structures in memory, when the TLB unit 88 detects a miss in the TLB 82 for a given address of a memory access transaction. For example a page table walk unit 94 within the translation control unit 90 may use registers defining base addresses of page table structures, index bits extracted from the address that missed in the TLB, and any results of previous page table walk transactions (which may be stepping through a multi-level page table structure), to form addresses of subsequent page table walk transactions issued to request further page table information from memory, until eventually the required page table data for providing a physical address corresponding to the address which missed in the TLB 82 can be identified. In the example of FIG. 7, the page table walk transactions are issued directly to a downstream component from the translation control unit 90, so that the translation control unit 90 and bus interface unit 86 have separate connections to the interconnect 66. Alternatively, the page table walk transactions may actually be routed to the interconnect 66 via the bus interface unit 86, in a similar way to other memory access transactions which are not page table walks.

Hence, when a memory access transaction is received by the SMMU 80, it may specify a transaction identifier, a virtual address, and an indication of whether the transaction is a read or write transaction, and for write transactions may also specify write data. The bus interface unit 86 may provide a translation request to the TLB unit 88 specifying the virtual address, which the TLB unit 88 may lookup in its TLB 82. If there is a hit in the TLB 82, then the matching TLB entry may be used to identify the corresponding physical address which is returned to the bus interface unit 86 along with the identifier of the current epoch as specified in current epoch register 12. Also the translation request may trigger incrementing of the relevant epoch counter 14 within the transaction tracking circuitry 6 as discussed above. The bus interface unit 86 may then provide the epoch identifier and physical address along with the other parameters of the memory access transaction (other than virtual address) that were received from the upstream source, when the transaction is issued downstream. When a transaction response is received by the bus interface unit 86, the bus interface unit 86 signals to the TLB unit 88 that a transaction associated with the epoch identifier specified by the transaction response is complete, which causes the relevant transaction counter in the transaction tracking circuitry 6 to be decremented. The transaction response is also passed back to the source device by the bus interface unit 86, including read data when the transaction which triggered the response was a read, or a write completion acknowledgement if the transaction was a write.

Figure 8:
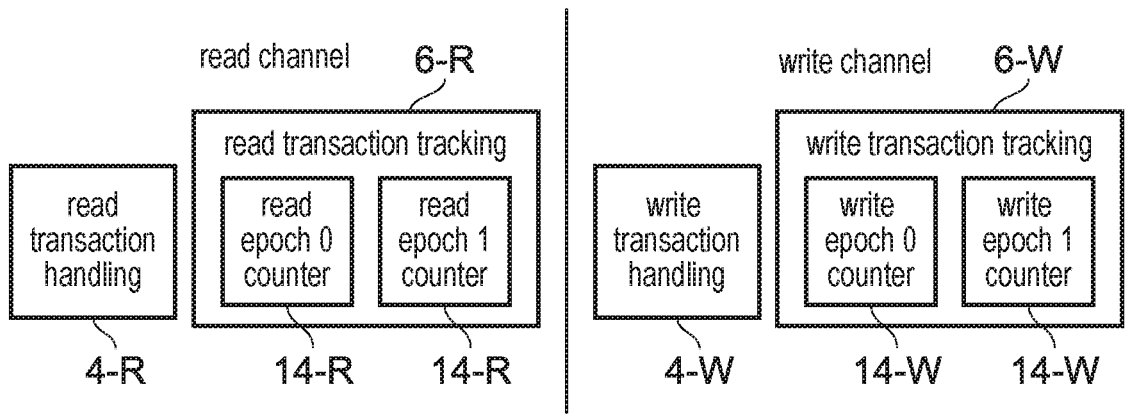
FIG. 8 illustrates how epoch-based tracking of transactions may be performed separately for a read channel and a write channel.

As shown in FIG. 8, in some examples read and write transactions may be handled using separate sections of circuit logic 4-R, 4-W within the bus interface unit 86 or other parts of the SMMU 80, and so it may be more efficient to track reads and writes separately in the transaction tracking circuitry 6, which could also be split into separate read and write portions 6-R, 6-W. Hence as shown in FIG. 8, separate sets of epoch counters 14-R, 14-W could be maintained for read and write transactions respectively. In this case, effectively the transaction handling circuitry 4 and transaction tracking circuitry 6 is divided into separate read and write portions 4-R, 4-W, 6-R, 6-W, and when the barrier termination circuitry 8 needs to determine whether at a given barrier command is complete it will check both the read counter 14-R and write counter 14-W associated with the relevant epoch.

Returning to FIG. 7, the barrier termination circuitry 8 in the TLB unit 88 receives the barrier termination command (e.g. from the CPU 60 which executed a barrier termination instruction), and determines based on the transaction tracking circuitry 6 whether the barrier can be signalled as complete. The invalidation control circuitry 92 controls the TLB 82 to perform invalidations in response to an invalidation command (received from the CPU 60 which executed a TLB invalidation instruction), and provides an invalidation response when the invalidation is complete. The barrier point signal which triggers the epoch changing circuitry 10 to change epochs could be either the invalidation command received by the invalidation control circuitry 92 or the barrier termination command (invalidation synchronisation command) received by the barrier termination circuitry 8. Different options are available for implementing this. FIGS. 9-13 show a number of different options for controlling the updating of epochs.

Figure 9:
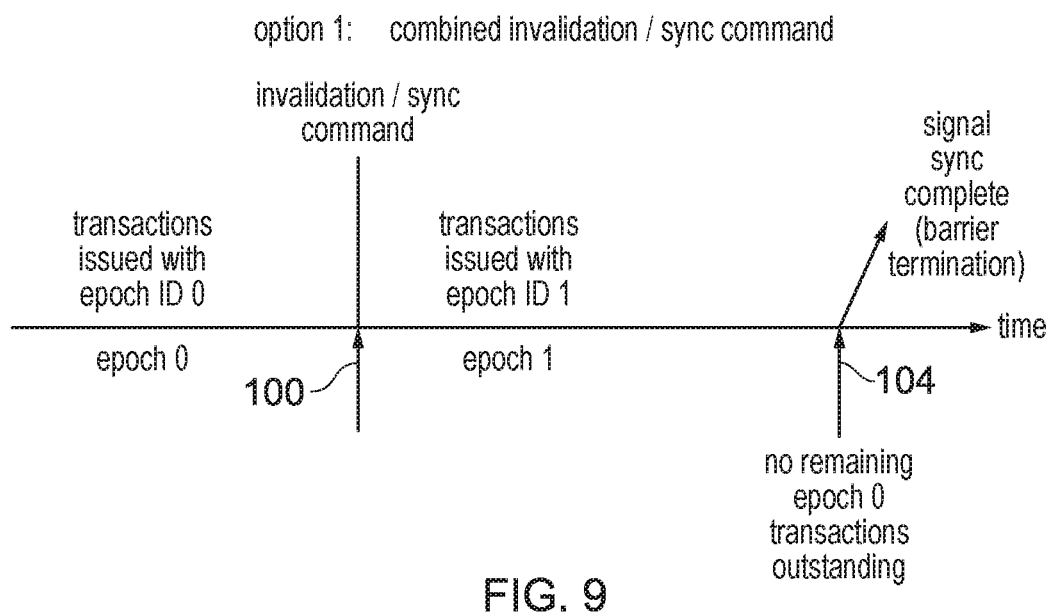
FIGS. 9 to 13 illustrate five options for implementing the tracking of completion of the invalidation synchronisation command based on the epochs in which transactions are issued.

FIG. 9 shows a first option, for systems where the invalidation command and the synchronisation command are actually the same command. Hence the same command triggers both the invalidation of entries from the TLB 82 and the barrier termination circuitry 8 to start checking whether preceding memory access transactions have completed. In the example of FIG. 9, prior to the invalidation/synchronisation command being received, the current epoch 12 is epoch 0 so all the memory access transactions issued in this period have an epoch identifier specifying epoch 0. At time 100 the invalidation command (which also acts as a synchronisation command) is received and this triggers the invalidation control circuitry 92 to walk through entries of the TLB to invalidate entries which match a certain invalidation condition. In addition this command also triggers epoch changing circuitry 10 to switch the current epoch to the next epoch, namely epoch 1. Therefore, subsequently issued memory access transactions specify the epoch identifier equal to 1. As mentioned above, there is some flexibility as to the exact timing when the epoch is changed, depending on how the TLB implements its invalidations. At time 104 the transaction counter for epoch 0 indicates that there are no remaining transactions outstanding, and so it can be determined that any transaction preceding the barrier point at the time 100 have completed. Provided the invalidation itself is also complete, the barrier termination circuitry 8 issues the barrier completion signal to signal that the synchronisation is complete and so any operations waiting for that synchronisation to be complete can then proceed. Hence, with this example the barrier point signal is the combined invalidation/synchronisation command and the relevant epoch to check to decide whether the barrier termination can be completed is the epoch which was current at the time of receiving the combined invalidation/synchronisation command (i.e. epoch 0 in the example of FIG. 9).

Figure 10:
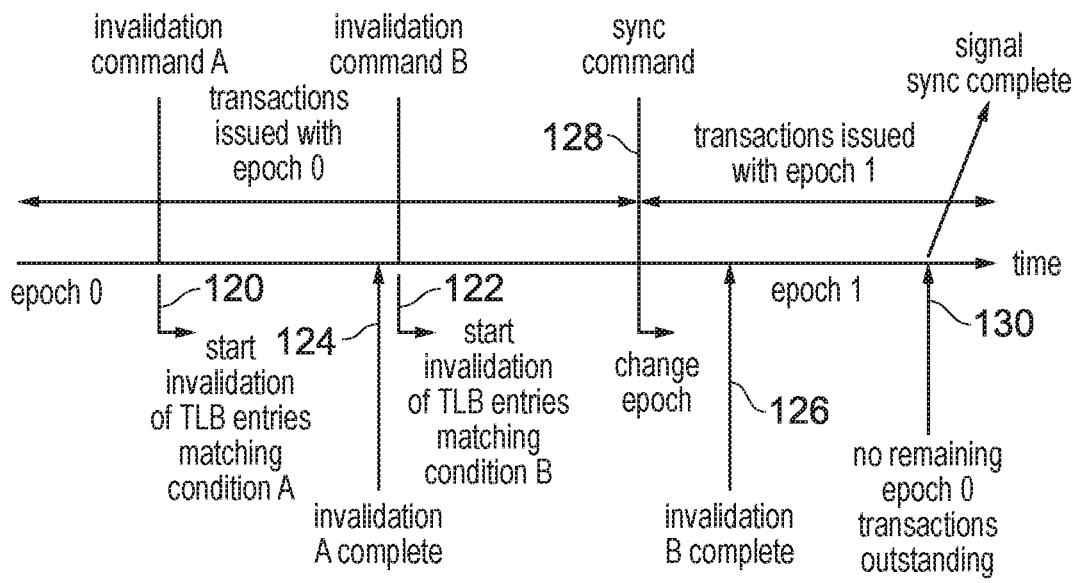

FIG. 10 shows a second example showing an implementation option for systems which support separate commands for invalidation and invalidation synchronisation (barrier termination). In this example the barrier point is considered to be the time of receiving the invalidation synchronisation command which triggers the barrier termination circuitry 8 to start checking for barrier completion and which then also changes the epoch from the current epoch to the next epoch. The invalidation command which triggers invalidation control circuitry 92 to invalidate TLB entries in this example does not cause the epoch to be changed. FIG. 10 shows an example timeline for a sequence of commands and in this example two successive invalidation commands A and B are received prior to a synchronisation command. Initially the current epoch is epoch 0 and this remains as the current epoch even though invalidation commands have been received at times 120,122. The invalidations triggered by invalidation commands A and B are completed at times 124 and 126 respectively. The synchronisation command is received at time 128 and this acts as a barrier point signal which controls the epoch changing circuitry 10 to change the epoch to epoch 1 and so subsequent transactions issued after time 128 now specify epoch 1. The synchronisation command also controls the barrier termination circuitry 8 to start checking whether the transaction tracking circuitry 6 indicates that all transactions issued with the epoch identifier of 0 (which was the current epoch at the time of receiving the synchronisation command) are complete. At time 130 the transaction counter for epoch 0 returns to 0 and this implies that there are no remaining epoch 0 transactions outstanding and so the barrier termination circuitry 8 can issue the barrier completion signal to indicate that the synchronisation is complete.

Figure 11:
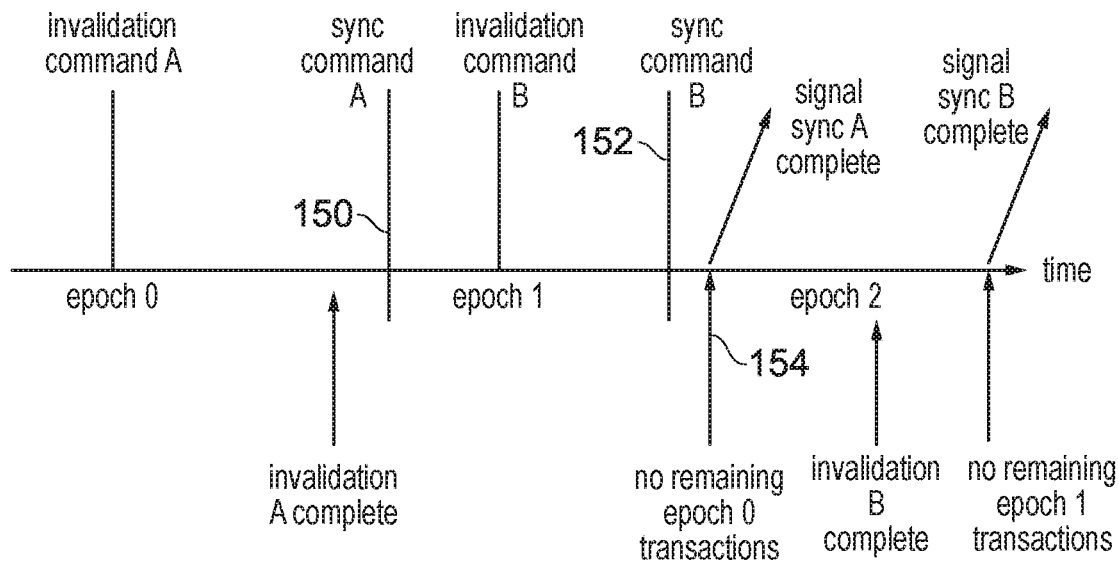

In options 1 and 2, it is assumed that the system supports 2 epochs, epoch 0 and epoch 1. However, it is also possible to support more than 2 epochs, by providing additional transaction counters within a transaction tracking circuitry 6 and providing an epoch identifier field in the memory access transactions and responses with multiple bits. This could be done in different ways, either by cycling through epochs in a fixed sequence using a multi-bit epoch number represented as a binary value, or by maintaining separate epoch bits for each parallel synchronisation event to be tracked with separate counters for each. FIG. 11 shows the first of these approaches and FIG. 12 shows the second.

As shown in FIG. 11, when multiple synchronisation events are tracked using an epoch identifier represented as a binary number with multiple bits, the current epoch can be changed each time a synchronisation command is received (up to the point at which all the available epochs have been used without resolving an earlier synchronisation command, as reflected by step 42 of FIG. 4 discussed above). In this example the initial epoch is epoch 0 and at time 150 a first synchronisation command A is received which triggers the epoch changing circuitry 10 to change the current epoch to the next epoch, epoch 1. Before signalling of the synchronisation command A is complete, a second synchronisation command B is received at time 152 and this results in the epoch being updated again to epoch 2. The support for more than 2 epochs means that it was not necessary to delay the transition of epoch from epoch 1 to epoch 2 until synchronisation command A had been completed, which can be useful because it means that the completion of synchronisation command B does not need to wait for completion of memory access transactions issued between time 152 and time 154 when the first synchronisation command is complete, which might otherwise be required if only 2 epochs had been supported and so the change of epoch for the second synchronisation command B would have had to wait until time 154.

Figure 12:
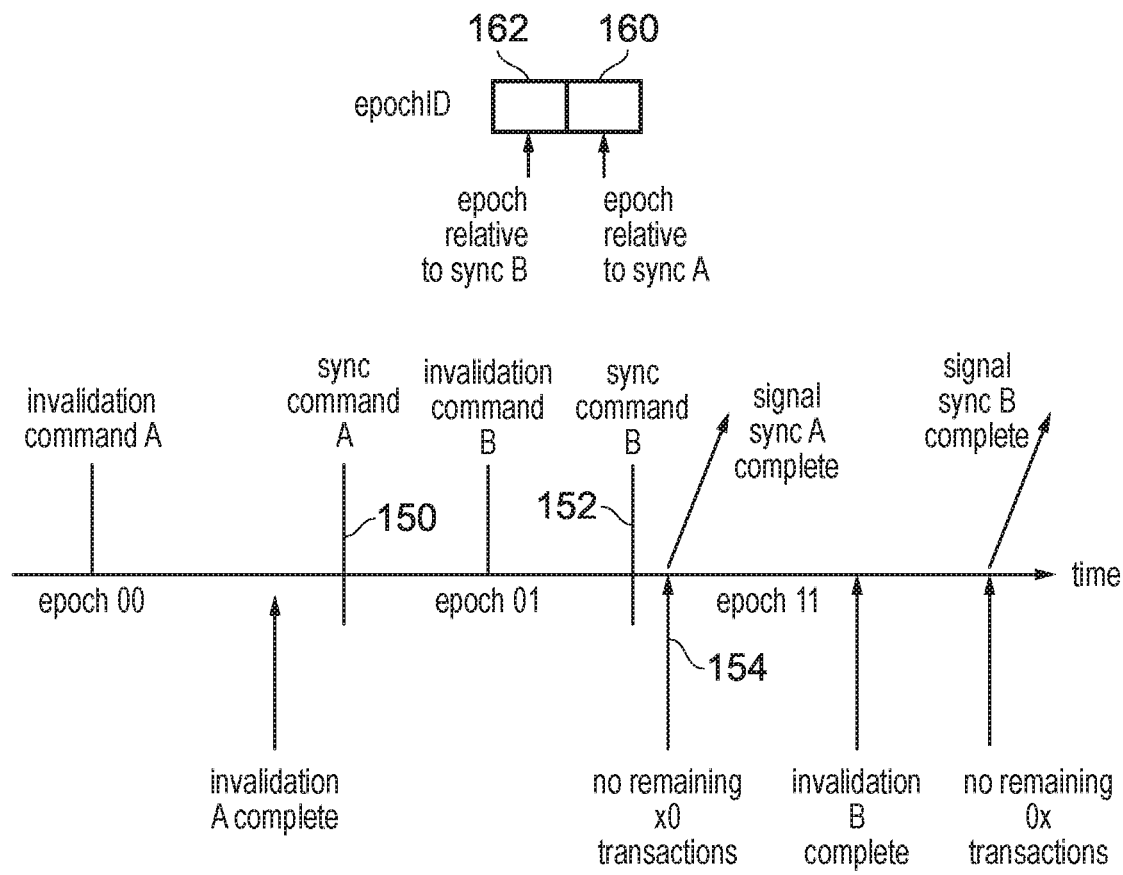

FIG. 12 shows a second option for tracking multiple synchronisations at once. In terms of the timings of events these are the same as shown in FIG. 11 but the epochs are tracked with a different form of epoch identifier. In this example, as shown at the top of FIG. 12 the epoch identifier may have a first bit 160 which identifies the epoch relative to a first synchronisation operation A and a second bit 162 which identifies the epoch relative to a second synchronisation event B. Of course, this approach could be extended to 3 or more different synchronisation events if needed using further bits. Hence, in this example initially the epoch is 00 which indicates that relative to synchronisation command A the current epoch is epoch 0 and relative to synchronisation command B the current epoch is also epoch 0. In response to the synchronisation command A at time 150 the bit 160 is switched to indicate that relative to synchronisation command A the epoch is now 1, but bit 162 stays as 0. In response to the second synchronisation command B at time 152 bit 162 is switched to indicate that relative to synchronisation command B the current epoch is now epoch 1. Hence, in response to synchronisation command A, the relevant epochs to check for completion by the barrier termination circuitry 8 would be any epochs which have 0 set for bit 160 but could have set either 0 or 1 for bit 162. Hence, completion of synchronisation command A will depend on completion of both transactions tagged with epoch identifier 00 and transactions tagged with epoch identifier 10 if there were such transactions. In a similar way for synchronisation command B at time 152 the completion of that command will have to wait until there are no remaining transactions tagged with either 00 or with 01, as the relevant epoch to check for synchronisation command B is epoch 0 relative to that synchronisation command as flagged by bit 162. Other than the difference in encoding the epochs using the epoch identifier, the timings are the same as in FIG. 11 and this provides another way of effectively ensuring that synchronisation command B does not need to defer its completion until the memory transactions issued between times 152 and 154 have completed.

The examples shown in FIGS. 9 to 12 may support the epoch being changed to the next epoch in response to a synchronisation command, before a TLB invalidation requested by an earlier TLB invalidation command is complete. To enable this, either the TLB may prevent any further lookups in the TLB while a TLB invalidation is in progress (so no further transactions will be issued specifying the next epoch until the invalidation is complete), or a progress identifier acting as a "watermark" may track the latest entry checked in the invalidation walk of the TLB, so that transactions hitting against entries earlier in the walk sequence may be allocated the next epoch identifier and transactions hitting against entries later in the walk sequence may be allocated the current epoch identifier, in the period when the invalidation is still in progress.

Another alternative would be that if an invalidation is still in progress when the synchronisation command is received, the switch to the next epoch is deferred until the invalidation is complete, to ensure that no transaction tagged with the next epoch identifier can have used potentially out of date translation data from a TLB entry which is subsequently invalidated in the remaining part of the invalidation operation. Hence, while the synchronisation command may be the trigger for updating the epoch (in the sense that if no synchronisation command was received at all, the epoch would not have been updated), the timing of updating the epoch may be deferred until a pending invalidation is complete. If this option is chosen, transactions issued in the period between time 128 and time 126 in FIG. 10 would have been tagged with epoch 0 instead of epoch 1 for example, and similarly transactions issued in the period between time 152 and time 154 in FIGS. 11 and 12 would have retained the epoch identifier from the epoch preceding time 152, instead of receiving the new epoch identifier as shown in these examples.

Figure 13:
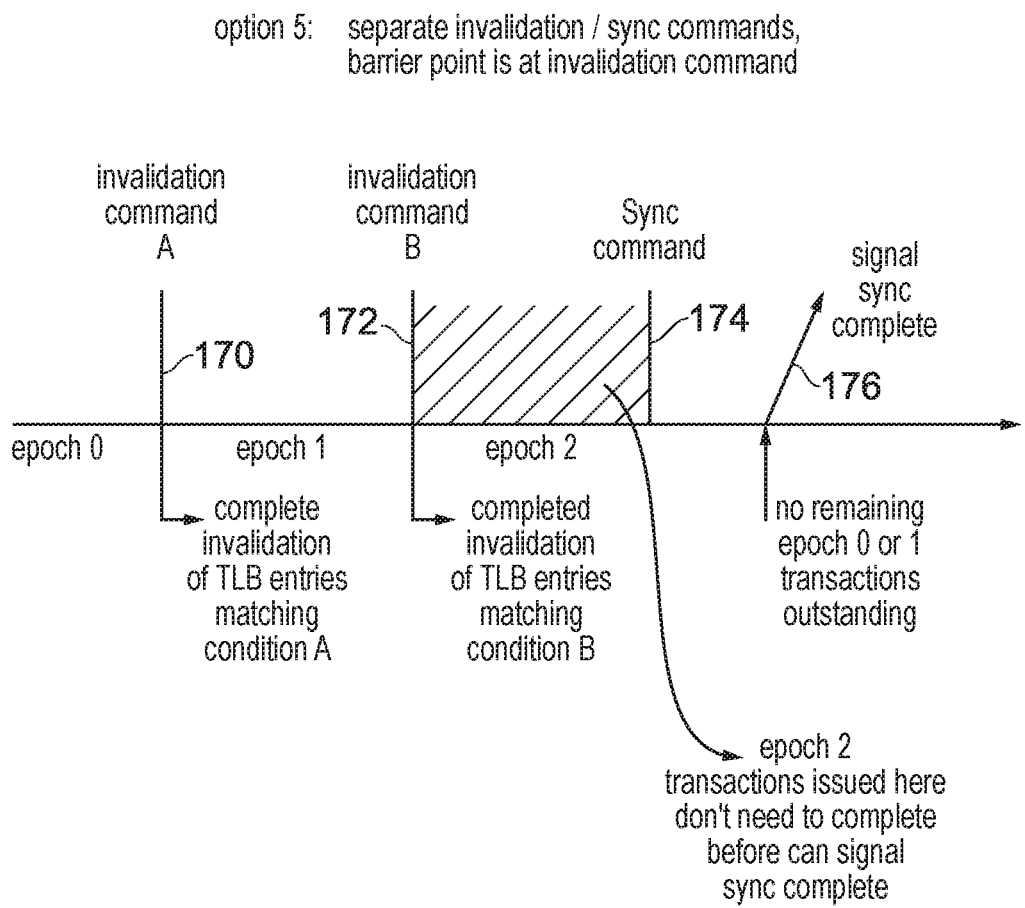

FIG. 13 shows a fifth approach which can be that, where separate commands are provided for invalidation and invalidation synchronisation, the barrier point signed is defined as the invalidation command rather than when the invalidation synchronisation command is received. This approach can enable faster response to the synchronisation operations, but may require supporting of a larger number of epochs. In this case, when a synchronisation command is received, the current epoch is not changed, as instead the epoch is changed in response to invalidation command (again with some flexibility as to the exact time when the epoch is changed as discussed above). For the invalidation synchronisation command, the relevant epochs to check are all prior epochs to the current epoch at the time of receiving the invalidation synchronisation command. Hence signalling of completion of the barrier termination will wait until all those prior epochs have drained of outstanding transactions as indicated by the transaction tracking circuitry 6.

The timeline in FIG. 13 illustrates such an example. Initially transactions are issued with epoch 0. An invalidation command is received at time 170 and in this example completion of the invalidation triggers the epoch to be changed to epoch 1. When a subsequent invalidation command B is received at time 172 then again once the invalidation has completed this triggers new transactions to be issued with a changed epoch 2. As mentioned above other TLB implementations could change the epoch on receipt of the invalidation command or have a transition period when both old and new epochs are used for transactions depending on the position of the hit TLB entry relative to progress of the invalidation walk. When the synchronisation command is received at time 174 then there is no need to change the epoch. For the synchronisation command the relevant epochs to check are epochs 0 and epochs 1, which are older than the current epoch 2 at the time of receiving the synchronisation command. Hence, once it is determined that no remaining epoch 0 or epoch 1 transactions are outstanding then at time 176 the barrier termination circuitry 8 can signal that the synchronisation is complete. An advantage of this approach is that the barrier termination completion does not depend on transactions issued in the period between time 172 and time 174 completing. Effectively the barrier point has been backdated to completion of the most recent invalidation command before the synchronisation command, rather than being at the time of the synchronisation command itself. By removing some of the memory access transactions from influencing the completion of the synchronisation command this improves performance. However, as multiple invalidation commands may be received and it is needed to track the completion of each one with a new epoch, this may require a greater number of epochs to be supported which may increase the overhead of the transaction tracking.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   transaction handling circuitry to issue memory access transactions, each memory access transaction specifying an epoch identifier indicative of a current epoch in which the memory access transaction is issued;
   transaction tracking circuitry to track, for each of at least two epochs, a number of outstanding memory access transactions issued in that epoch;
   barrier termination circuitry to signal completion of a barrier termination command when the transaction tracking circuitry indicates that there are no outstanding memory access transactions remaining which were issued in one or more epochs preceding a barrier point; and
   epoch changing circuitry to change the current epoch to a next epoch, in response to a barrier point signal representing said barrier point,
   in which in response to the barrier point signal, the epoch changing circuitry is configured to prevent the current epoch being changed to the next epoch, when there is still at least one outstanding memory access transaction associated with the next epoch, or the next epoch is one of said one or more epochs for an earlier barrier termination command which has not yet been signalled as completed.

2. The apparatus according to claim 1, in which the barrier point signal comprises said barrier termination command.

3. The apparatus according to claim 2, in which said one or more epochs comprises the epoch which is the current epoch at a time of receiving the barrier termination command, prior to the current epoch being changed to the next epoch in response to said barrier termination command.

4. The apparatus according to claim 1, in which the barrier point signal comprises a barrier point identifying signal different to said barrier termination command.

5. The apparatus according to claim 4, in which said one or more epochs comprises one or more epochs which are older than the epoch which is the current epoch at a time of receiving the barrier termination command.

6. The apparatus according to claim 1, in which the transaction handling circuitry is configured to initiate a lookup, in a translation lookaside buffer, of page table information corresponding to an address specified by a memory access transaction to be issued.

7. The apparatus according to claim 6, in which in response to an invalidation command, the translation lookaside buffer is configured to perform an invalidation of page table information satisfying an invalidation condition; and
   the barrier termination command comprises an invalidation synchronisation command requesting that the barrier termination circuitry signals completion of the barrier termination command when the invalidation has completed and at least any memory access transactions for which the lookup in the translation lookaside buffer was performed prior to receipt of the invalidation command have completed.

8. The apparatus according to claim 7, in which the invalidation command and the invalidation synchronisation command are the same command.

9. The apparatus according to claim 7, in which the invalidation command is a different command to the invalidation synchronisation command.

10. The apparatus according to claim 9, in which the barrier point signal comprises the invalidation synchronisation command.

11. The apparatus according to claim 9, in which the barrier point signal comprises the invalidation command.

12. The apparatus according to claim 1, in which the transaction tracking circuitry comprises at least two transaction counters, each transaction counter to count the number of outstanding memory access transactions issued in a corresponding epoch.

13. The apparatus according to claim 12, in which the transaction tracking circuitry is configured to increment a transaction counter corresponding to the current epoch, in response to a memory access transaction to be issued by the transaction handling circuitry.

14. The apparatus according to claim 12, in which in response to issuing a memory access transaction specifying a given epoch identifier, the transaction handling circuitry is configured to receive a transaction response specifying the given epoch identifier; and
   in response to receipt of the transaction response, the transaction tracking circuitry is configured to decrement a transaction counter corresponding to the epoch indicated by the given epoch identifier specified by the transaction response.

15. The apparatus according to claim 1, in which the transaction tracking circuitry is configured to track the number of outstanding memory access transactions for only two epochs.

16. The apparatus according to claim 1, in which the transaction tracking circuitry is configured to track the number of outstanding memory access transactions for more than two epochs.

17. A method comprising:
issuing memory access transactions, each memory access transaction specifying an epoch identifier indicative of a current epoch in which the memory access transaction is issued;
tracking, for each of at least two epochs, a number of outstanding memory access transactions issued in that epoch;
changing the current epoch to a next epoch, in response to a barrier point signal representing a barrier point; and
signalling completion of a barrier termination command when the tracking indicates that there are no outstanding memory access transactions remaining which were issued in one or more epochs preceding the barrier point,
in which in response to the barrier point signal, the method comprises preventing the current epoch being changed to the next epoch, when there is still at least one outstanding memory access transaction associated with the next epoch, or the next epoch is one of said one or more epochs for an earlier barrier termination command which has not yet been signalled as completed.

18. An apparatus comprising:
transaction handling circuitry to issue memory access transactions, each memory access transaction specifying an epoch identifier indicative of a current epoch in which the memory access transaction is issued;
transaction tracking circuitry to track, for each of at least two epochs, a number of outstanding memory access transactions issued in that epoch;
barrier termination circuitry to signal completion of a barrier termination command when the transaction tracking circuitry indicates that there are no outstanding memory access transactions remaining which were issued in one or more epochs preceding a barrier point; and
epoch changing circuitry to change the current epoch to a next epoch, in response to a barrier point signal representing said barrier point, wherein:
the transaction tracking circuitry comprises at least two transaction counters, each transaction counter to count the number of outstanding memory access transactions issued in a corresponding epoch;
the transaction tracking circuitry is configured to increment a transaction counter corresponding to the current epoch, in response to a memory access transaction to be issued by the transaction handling circuitry;
in response to issuing a memory access transaction specifying a given epoch identifier, the transaction handling circuitry is configured to receive a transaction response specifying the given epoch identifier; and
in response to receipt of the transaction response, the transaction tracking circuitry is configured to decrement a transaction counter corresponding to the epoch indicated by the given epoch identifier specified by the transaction response.

* * * * *